United States Patent [19]
Hahn et al.

[11] Patent Number: 4,769,394

[45] Date of Patent: Sep. 6, 1988

[54] EXPANDABLE STYRENE POLYMERS AND STYRENE POLYMER FOAMS

[75] Inventors: Klaus Hahn, Kirchheim; Isidoor De Grave, Wachenheim, both of Fed. Rep. of Germany

[73] Assignee: BASF Aktiengesellschaft, Ludwigshafen, Fed. Rep. of Germany

[21] Appl. No.: 126,827

[22] Filed: Nov. 30, 1987

[30] Foreign Application Priority Data

Nov. 29, 1986 [DE] Fed. Rep. of Germany ....... 3640877

[51] Int. Cl.$^4$ ................................................ C08J 9/18
[52] U.S. Cl. ....................................... 521/60; 521/56; 521/146

[58] Field of Search ............................. 521/56, 60, 146

[56] References Cited

U.S. PATENT DOCUMENTS 3,503,908  3/1970  Ingram et al. ........................ 521/59
3,526,605  9/1970  Ingram ................................. 526/346

*Primary Examiner*—Morton Foelak
*Attorney, Agent, or Firm*—Keil & Weinkauf

[57] ABSTRACT

Expandable styrene polymers and styrene polymer foams having a particularly uniform and fine-cell foam structure contain, as a cell regulator, small amounts of a mixture of resin acids, lower alkyl esters of resin acids or (hydro)abietyl phthalate and a polyoxyethylene monoester or monoether.

2 Claims, No Drawings

EXPANDABLE STYRENE POLYMERS AND STYRENE POLYMER FOAMS

The present invention relates to styrene polymer foams having a particularly uniform and fine-cell foam structure. The present invention furthermore relates to expandable styrene polymers which, when expanded, give particularly uniform and fine-cell foams.

The preparation of styrene polymer foams is known. In industry, the molten styrene polymer is mixed with the blowing agent in a suitable mixing apparatus under superatmospheric pressure to give a homogeneous mixture, and the latter is then forced through a nozzle and is thus expanded to a foam.

In another industrial process, an expandable styrene polymer, ie. a styrene polymer containing a blowing agent, is first produced in particulate form and is then expanded to give a loose heap of foam particles by heating at above the softening point. The foam particles are then further expanded by heating again in a perforated pressure-resistant mold using superheated steam, the said particles being welded to give a foam molding.

The foam structure of the known styrene polymer foams is subject to considerable fluctuations. To date, it has been possible to obtain the desired cell counts only within narrow limits. In particular, a uniform finecell foam structure has not been satisfactorily realized to date.

We have found that this object is achieved by the addition of a small amount of a mixture of resin acids or their lower alkyl esters or (hydro)abietyl phthalate and a polyoxyethylene monoester or monoether.

The present invention accordingly relates to expandable styrene polymers containing
(a) from 3 to 15% by weight of a $C_3-C_8$-hydrocarbon or of a haloalkane as a blowing agent,
(b) from 0.005 to 0.3% by weight of a resin acid, of a lower alkyl ester of the resin acid or (hydro)abietyl phthalate and
(c) from 0.001 to 0.3% by weight of a polyoxyethylene monoester or monoether, with or without
(d) other conventional additives.

The present invention furthermore relates to styrene polymer foams having a density of from 0.01 to 0.05 g/cm$^3$ and containing
(a) from 0.005 to 0.3% by weight of a resin acid, of a lower alkyl ester of the resin acid or (hydro)abietyl phthalate and
(b) from 0.001 to 0.3% by weight of a polyoxyethylene monoester or monoether, with or without
(c) conventional additives.

U.S. Pat. No. 3,526,605 discloses that from 0.5 to 2.5% by weight of resin acids, such as (hydro)abietic acid or its lower alkyl esters or (hydro)abietyl phthalate are also used in the preparation of expandable styrene polymers. The products possess an extremely low molding temperature when being processed to foams. As a result, the foams also have the disadvantage of excessively low heat distortion resistance. Their foam structure, too, is unsatisfactory.

U.S. Pat. No. 3,503,908 discloses that the addition of from 0.15 to 0.28% by weight of a polyoxyethylene monoester or monoether during the preparation of expandable styrene polymers reduces the mold cooling time when foam moldings are produced from these polymers. However, the use of these additives results in problems with regard to suspension stability and coagulation during the preparation of the expandable styrene polymers. Furthermore, the foam structure of the resulting foams is nonuniform.

Surprisingly, the disadvantages observed with the concomitant use of resin acids or their lower alkyl esters or of polyoxyethylene monoesters or monoethers are not encountered if, in accordance with the present invention, a combination of the two additives is used. Completely surprising, furthermore, is the fact that the novel foams possess a structure which is completely uniform and whose cell count can be adjusted, as demonstrated in detail by the Examples and Comparative Examples.

For the purposes of the present invention, styrene polymers are polystyrene and copolymers of styrene with other $\alpha,\beta$-olefinically unsaturated compounds which contain not less than 50 parts by weight of styrene as copolymerized units. Examples of suitable copolymerization components are $\alpha$-methylstyrene, styrenes which are halogenated in the nucleus, styrenes which are alkylated in the nucleus, acrylonitrile, esters of acrylic or methacrylic acid with alcohols of 1 to 8 carbon atoms, N-vinyl compounds, such as vinyl carbazole, maleic anhydride or small amounts of compounds which contain two polymerizable double bonds, such as butadiene, divinylbenzene or butanediol diacrylate. Copolymers and graft polymers of from 40 to 90% by weight of polystyrene and from 10 to 60% by weight of polyethylene or polypropylene are also suitable.

The expandable styrene polymers are prepared by a conventional method. They may be in the form of beads, cylindrical granules or fragments, as obtained when polymers are milled. The particles advantageously have a diameter of from 0.1 to 6 mm, in particular from 0.4 to 3 mm.

The styrene polymers contain one or more homogeneously dispersed blowing agents. Examples of suitable blowing agents are $C_3-C_8$-hydrocarbons or halohydrocarbons which are gaseous or liquid under standard conditions of temperature and pressure and do not dissolve the styrene polymer and whose boiling point is below the softening point of the polymer. Examples of suitable blowing agents are propane, butane, pentane, cyclopentane, hexane, cyclohexane, octane, dichlorodifluoromethane and trifluorochloromethane. The blowing agents are present in the styrene polymers in amounts of from 3 to 15% by weight, based on the polymer.

An essential feature of the invention is that the expandable styrene polymers and the styrene polymer foams contain, as an additive, a resin acid, such as abietic acid, hydroabietic acid or their isomers, lower alkyl esters of the resin acids, for example the methyl, ethyl, propyl, isopropyl, n-, iso- or tert-butyl esters, abietyl phthalate or hydroabietyl phthalate. Mixtures of these substances may also be used. The additive is used in amounts of from 0.005 to 0.3, preferably from 0.01 to 0.1, % by weight, based on the styrene polymer. The industrial resin acids, such as (hydro)abietic acid mixtures, and natural substances, such as rosin, which essentially consist of these substances are also suitable.

Another essential feature of the invention is that the expandable styrene polymers and styrene polymer foams contain a polyoxyethylene monoester or monoether as a further additive. The polyoxyethylene radical of these esters or ethers contains, for example, from 3 to 50, preferably from 4 to 30, in particular from 5 to 25, oxyethylene units. The esters or ethers are preferably derived from long-chain carboxylic acids and alcohols, respectively, in particular those of 6 to 40, preferably 6 to 20, carbon atoms.

Examples of suitable substances are polyoxyethylene sorbitan monolaurate, polyoxyethylene sorbitan monooleate, polyoxyethylene sorbitan monopalmitate, polyoxyethylene monolaurate, polyoxyethylene monostearate, polyoxyethylene monolauryl ether, polyoxyethylene monocetyl ether and monooxyethylene monooleyl ether. The substances are used in amounts of from 0.001 to 0.3, preferably from 0.005 to 0.1, % by weight, based on the styrene polymer.

Oxyethylenation products of industrial alcohols, such as palm fatty alcohol, are also suitable.

The expandable styrene polymers and the styrene polymer foams may also contain other conventional additives which impart certain properties to the products.

Specific examples are flameproofing agents based on organic bromine or chlorine compounds, such as tridibromopropyl phosphate, hexabromocyclododecane and chloroparaffin, and synergistic agents for flameproofing agents, such as dicumyl and readily decomposable organic peroxides, as well as antistatic agents, stabilizers, colorants, lubricants, fillers, and substances which have an anti-adhesive effect during prefoaming, such as zinc stearate, magnesium stearate, melamine/-formaldehyde condensates or silica. Depending on the intended effect, the additives can be homogeneously dispersed in the particles or present as the surface coating.

The expandable styrene polymers and the foams, may for example, also contain conventional agents for reducing the demolding time, for example glycerol esters, such as glycerol distearyl ether, as a coating. Mixtures of hydroxycarboxylates with glycerol esters in a weight ratio of from 5:1 to 1:5 are particularly advantageous.

The esters are present, at least for the predominant part, as a coating on the surface of the expandable polystyrene particles and are very uniformly distributed. The method of application is not critical; the finely divided ester may be applied to the styrene polymer particles, for example, simply by tumbling in a conventional mixer. However, it is also possible to apply the ester from an aqueous dispersion or a solution in an organic solvent; the solvent or the water must be removed during application. Furthermore, the esters may also be added to the styrene polymerization batch at the end or toward the end of the suspension polymerization.

The expandable styrene polymers are prepared by conventional methods, for example by mixing the styrene polymers with the blowing agent and the additives in a mixing apparatus, for example an extruder. If the melt is extruded into a zone under reduced pressure and is cooled immediately, so that the extrudate does not expand, an expandable styrene polymer is obtained. However, the melt can also be expanded to a foam directly after emerging from the mixing apparatus. For the preparation of expandable products, however, it is also possible for the styrene polymer in the form of granules or beads in aqueous suspension to be impregnated with the blowing agent and the additives at elevated temperatures.

The expandable styrene polymers are advantageously prepared by polymerization of monomeric styrene in aqueous dispersion in the presence of the blowing agent and of the additives. After the preparation, they are present in finely divided form, for example in the form of beads, and generally have a particle diameter of 0.1 to 6 mm, preferably from 0.4 to 3 mm. They are further expanded by a conventional method in the preexpanded state by heating in molds which are not gas-tight when closed, and are sintered to foam moldings whose dimensions correspond to the cavity of the mold used.

EXAMPLES (A) Experiments on subsequent impregnation 100 parts of fully deionized water, 3 parts of tricalcium phosphate, 0.02 part of sodium dodecylbenzenesulfonate, 1 part of sodium chloride, 150 parts of polystyrene beads, 6.4 parts of n-pentane and the additives stated in the Table were initially taken in a pressure-tight stirred kettle. The stirred mixture was heated to 110° C. in the course of 2 hours and kept at this temperature for 6 hours. After the mixture had cooled, the pH was brought to 1.4 by adding hydrochloric acid. The beads were removed by centrifuging, washed with water and dried with a stream of air.

(B) Polymerization experiments

In a pressure-tight stirred stainless steel kettle, a mixture of 150 parts of fully deionized water, 0.1 part of sodium pyrophosphate, 100 parts of styrene, 7 parts of pentane, 0.45 part of benzoyl peroxide, 0.15 part of tert-butyl perbenzoate and the amounts of additives stated in the Table were heated to 90° C., while stirring.

After 2 hours at 90° C., 4 parts of a 10% strength solution of polyvinylpyrrolidone were added.

Stirring was continued for a further 2 hours at 90° C., then for 2 hours at 100° C. and finally for 2 hours at 120° C.

The resulting granules having a mean particle diameter of 1.1 mm were isolated, washed and dried.

(C) Production of foams

The polystyrene granules from A and B, containing blowing agent and having particle fractions of from 0.7 to 1.2 mm, were coated with 0.3% by weight of glycerol monostearate by tumbling in a Lödige paddle mixer. The polystyrene particles were preexpanded to a bulk density of 20 g/l by the action of a stream of steam in a continuous Rauscher stirred preexpander, stored for 24 hours and then welded to form a parallelipiped foamed article by treatment with steam under 2.1 bar in an automatic Hofstetter molding machine. The welds were determined by the method described in U.S. Pat. No. 3,526,605.

The results obtained are summarized in the Tables. In the Examples, parts are by weight.

TABLE 1

| Additive (%) | Experiments on subsequent impregnation |||||||||||
|---|---|---|---|---|---|---|---|---|---|---|
| | Experiment no. |||||||||||
| | 1 | 2 | 3 | 4 | 5 | 6 | 7 | 8 | 9 | 10 |
| Abietic acid | — | 0.1 | 0.5 | 0.8 | 1.5 | — | — | — | — | — |
| Hydroabietic acid | — | — | — | — | — | 1.5 | — | — | — | — |
| Rosin according to | — | — | — | — | — | — | 1.5 | — | — | — |

TABLE 1-continued

| Experiments on subsequent impregnation | | | | | | | | | | |
|---|---|---|---|---|---|---|---|---|---|---|
| DIN 55,935 | | | | | | | | | | |
| Industrial hydro-abietic acid mixture | — | — | — | — | — | — | — | 1.5 | — | — |
| Tallow fatty alcohol × 25 ethylene oxide | — | — | — | — | — | — | — | — | 0.05 | 0.1 |
| Tallow fatty alcohol × 11 ethylene oxide | — | — | — | — | — | — | — | — | | |
| Tallow fatty alcohol × 50 ethylene oxide | — | — | — | — | — | — | — | | | |
| Tallow fatty alcohol × 5 ethylene oxide | — | — | — | — | — | — | — | | | |
| Welding | 10 | 10 | 8 | 23 | 40 | 31 | 26 | 43 | 5 | 10 |
| Cell count C/mm | 3 | 2.5 | 3.2 | 4.9 | 5.6 | 4.9 | 5.1 | 4.4 | 4.9 | 5.6 |
| Cell structure[1] | n.h | n.h | n.h | n.h | n.h | n.h | n.h | n.h | n.h | n.h |

| Additive | Experiment no. | | | | | | | | | |
|---|---|---|---|---|---|---|---|---|---|---|
| (%) | 11[2] | 12[2] | 13 | 14 | 15 | 16 | 17 | 18 | 19 | 20 |
| Abietic acid | — | — | — | — | — | 0.01 | — | — | — | — |
| Hydroabietic acid | — | — | — | — | — | — | — | — | — | — |
| Rosin according to DIN 55,935 | — | — | — | — | — | — | 0.01 | — | — | — |
| Industrial hydro-abietic acid mixture | — | — | — | — | — | — | — | 0.01 | 0.01 | 0.01 |
| Tallow fatty alcohol × 25 ethylene oxide | 0.2 | — | — | — | — | — | — | — | — | — |
| Tallow fatty alcohol × 11 ethylene oxide | — | 0.2 | — | — | — | — | — | — | — | — |
| Tallow fatty alcohol × 50 ethylene oxide | — | — | 0.2 | — | — | — | — | — | — | — |
| Tallow fatty alcohol × 5 ethylene oxide | — | — | — | 0.2 | — | — | — | — | 0.05 | 0.1 |
| Welding | — | 15 | — | 5 | 15 | 10 | 20 | 25 | 30 | 20 |
| Cell count C/mm | — | 6.0 | — | 5.8 | 3.0 | 7.8 | 8.6 | 9.6 | 9.8 | 10.5 |
| Cell structure[1] | — | n.h | — | n.h | n.h | h | h | h | h | h |

[1] h: homogeneous/n.h: nonhomogeneous
[2] Mixture coagulates

TABLE 2

| Additive | Polymerization experiments | | | | | | | | | | | |
|---|---|---|---|---|---|---|---|---|---|---|---|---|
| | Experiment no. | | | | | | | | | | | |
| (%) | 21 | 22 | 23 | 24[2] | 25[3] | 26[2] | 27 | 28 | 29 | 30 | 31 | 32 |
| Abietic acid | — | — | — | — | — | — | — | 0.01 | 0.01 | — | — | — |
| Hydroabietic acid | — | — | — | — | — | — | — | — | — | — | — | — |
| Rosin according to DIN 55,935 | — | — | — | — | — | — | 0.01 | — | — | — | 0.01 | — |
| Industrial hydro-abietic acid mixture | — | — | — | — | — | — | — | — | — | 0.01 | — | 0.01 | 0.01 |
| Tallow fatty alcohol × 25 ethylene oxide | — | 0.01 | 0.05 | 0.01 | — | — | — | — | — | — | 0.01 | 0.02 |
| Tallow fatty alcohol × 11 ethylene oxide | — | — | — | — | 0.05 | — | — | — | 0.05 | 0.05 | 0.05 | — | — |
| Tallow fatty alcohol × 50 ethylene oxide | — | — | — | — | — | 0.05 | — | — | — | — | — | — |
| Tallow fatty alcohol × 5 ethylene oxide | — | — | — | — | — | — | 0.05 | — | — | — | — | — |
| Welding | 40 | 10 | 5 | — | 10 | — | 20 | 20 | 15 | 20 | 25 | 20 | 15 |
| Cell count C/mm | 3.5 | 7 | 7.5 | — | 5.5 | — | 5.0 | 4.0 | 7.5 | 8.0 | 8.9 | 9.5 | 10.8 |
| Cell structure[1] | n.h | n.h | n.h | — | n.h | — | n.h | n.h | h. | h. | h. | h. | h. |

[1] h: homogeneous/n.h: nonhomogeneous
[2] Mixture coagulates
[3] Deformed beads

We claim:
1. Expandable styrene polymer particles which, comprises
   (a) from 3 to 15% by weight of a $C_3$–$C_8$- hydrocarbon or of a haloalkane as a blowing agent,
   (b) from 0.005 to 0.3% by weight of a compound selected from the group consisting of a resin acid, a lower alkyl ester of a resin acid and (hydro) abietyl phthalate and mixtures thereof, and
   (c) from 0.001 to 0.3% by weight of a polyoxyethylene monoester or monoether.

2. A styrene polymer foam having a density of from 0.01 to 0.05 g/cm$^3$ and containing
   (a) compound selected from the group consisting of a resin acid, a lower alkyl ester of a resin acid and (hydro) abietyl phthalate and mixtures thereof, and
   (b) from 0.001 to 0.3% by weight of a polyoxyethylene monoester or monoether.

* * * * *